Sept. 23, 1952 W. EXTON, JR 2,611,562
BODY SUPPORTING MECHANISM FOR OCCUPANTS
OF HIGH-SPEED CONVEYANCES
Filed June 19, 1948 3 Sheets-Sheet 1

INVENTOR
William Exton, Jr.
BY
Williams, Rich & Morse
ATTORNEYS

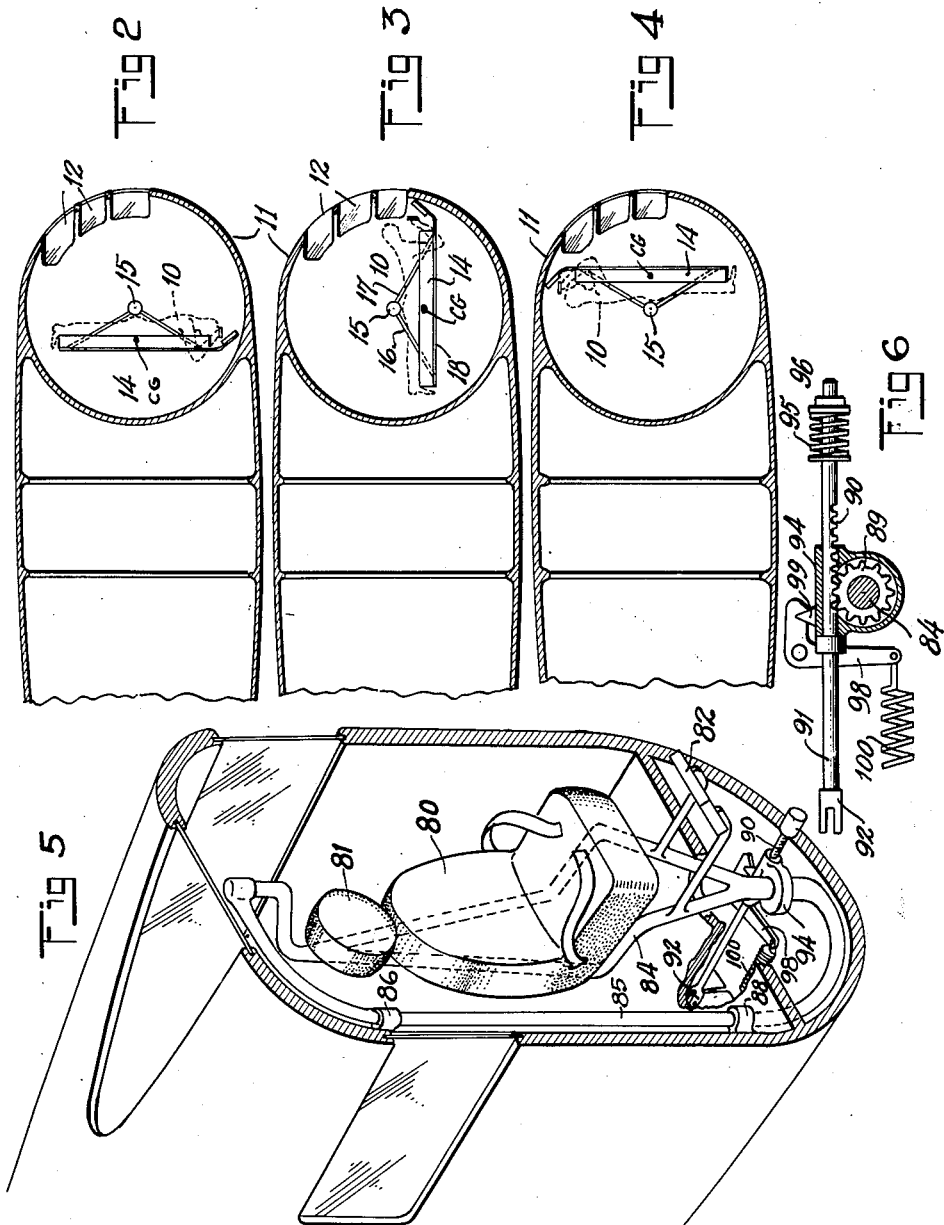

Sept. 23, 1952 W. EXTON, JR 2,611,562
BODY SUPPORTING MECHANISM FOR OCCUPANTS
OF HIGH-SPEED CONVEYANCES
Filed June 19, 1948 3 Sheets-Sheet 3
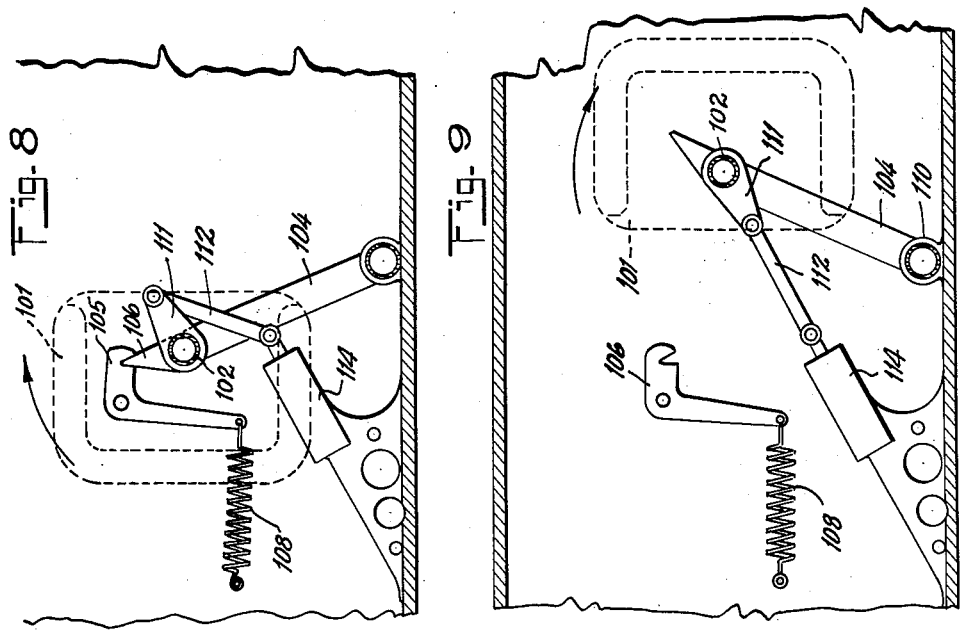
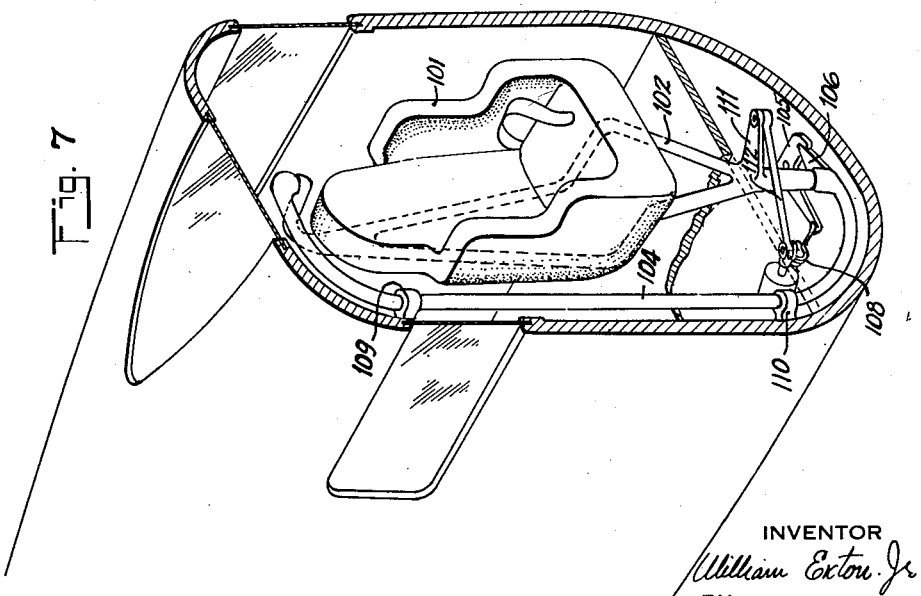
INVENTOR
William Exton Jr,
BY
Williams, Rich & Morse
ATTORNEYS Patented Sept. 23, 1952

2,611,562

UNITED STATES PATENT OFFICE 2,611,562

BODY SUPPORTING MECHANISM FOR OCCUPANTS OF HIGH-SPEED CONVEYANCES

William Exton, Jr., New York, N. Y.

Application June 19, 1948, Serial No. 34,076

4 Claims. (Cl. 244—83)

This invention relates to body-supporting means for the occupants of high speed conveyances, particularly aircraft, and especially to seats or pallets for supporting an occupant in a normal seated or prone position and so constructed and arranged that excessive inertia forces will act automatically to place and to support the occupant's body in that position in which it is best adapted physiologically to withstand those forces.

It has been established by medical science that when the human body is subjected to inertia forces, loss of consciousness results when those forces exceed certain amounts. In this art the forces are customarily referred to in terms of the force of gravity, expressed as "G". For example, a force of from 6G to 9G "positive," i. e. from head to foot, results in loss of consciousness due to a condition known as "black out." An even smaller force, or "negative G," acting in the opposite direction, results in loss of consciousness due to a condition known as "red out." The body is known to be capable of withstanding much greater forces without loss of consciousness when the inertia force is applied in a dorsal-ventral or ventral-dorsal direction. These phenomena are sufficiently well known to make further explanation unnecessary.

Excessive inertia forces may be applied to the occupants of modern aircraft or other high speed vehicles under various conditions as in the case of centrifugal forces produced in turning movements or the pullout from a dive where the forces result from a change in the direction of travel of the conveyance, which is opposed to the tendency of the body to continue traveling in the same straight line. Excessive inertia forces likewise result from sudden changes in velocity, either positive or negative, that is with either rapid acceleration or deceleration, opposed to the tendency of the body to continue in motion at constant speed or at rest, as the case may be. Examples of situations giving rise to such velocity changes are catapult launching, sudden application to or removal from the conveyance of great propulsive power, and most particularly the deceleration due to bringing the conveyance to a sudden stop, as in a crash. Other similar situations may exist in the case of escape devices wherein an airplane is equipped with a life-saving device in the nature of a capsule containing the pilot accommodation which is adapted to be ejected from a plane moving at high, and perhaps supersonic, speed and which of necessity suddenly decreases its velocity upon separation from the plane into the relatively stationary surrounding air.

An object of this invention is to provide a seat or other support, such as a pallet, for the occupant of a conveyance which support is movable and which, in response to inertia forces in excess of a predetermined amount, will move in such a way as to give the most adequate support to the body of the occupant against the effects of said forces.

A collateral object, related to the first and in some embodiments of the invention attainable simultaneously therewith, is to so move the support that the attitude of the occupant's body is changed into that position in which it most readily withstands the inertia forces physiologically, that is a dorsal-ventral or ventral-dorsal position relative to the force.

It is an object of the invention in all cases, whether or not the attitude of the body with reference to the conveyance is changed, to so move the support that it is interposed between the body and the place toward which the inertia force tends to move it.

Another object is to provide a seat or the like, for a high speed conveyance, which normally faces in the direction of travel and is adapted to reverse its position upon sudden deceleration, and which upon reversal preferably moves a short distance in the direction of travel to perform a shock absorbing function.

Other objects and advantages of the invention will in part appear and in part will be obvious from the ensuing description.

Various embodiments of the invention which illustrate the means by which the foregoing objects are attained are hereinafter described in conjunction with the drawings, in which:

Fig. 1 shows a pilot pallet for aircraft adapted to support the pilot's body in prone position together with its supporting means and associated with controls from the aircraft, represented schematically.

Figs. 2, 3 and 4 are diagrammatic illustrations of various positions which may be assumed by the pallet of Fig. 1 under extremes of inertia forces and the normal position assumed when the inertia force is below that at which the pallet is released for movement. Fig. 2 shows the effect on the pallet of an inertia force acting from front to rear longitudinally of the plane, as in sudden acceleration. Fig. 3 shows the normal position. Fig. 4 shows the position resulting from rapid deceleration.

Fig. 5 shows an accommodation in the form of a seat, with headrest and footrest, mounted for movement in a fore and aft direction and associated with gear-operated mechanism adapted to turn the seat through 180°, reversing the occupant, upon sudden deceleration.

Fig. 6 is a detail of part of the seat reversing mechanism of Fig. 5.

Fig. 7 shows another form of seat adapted to be reversed upon sudden deceleration by crank operated mechanism.

Fig. 8 shows the reversing mechanism of Fig. 7 in normal position; and

Fig. 9 shows the same in the position it assumes upon reversal of the seat.

Figure 1:
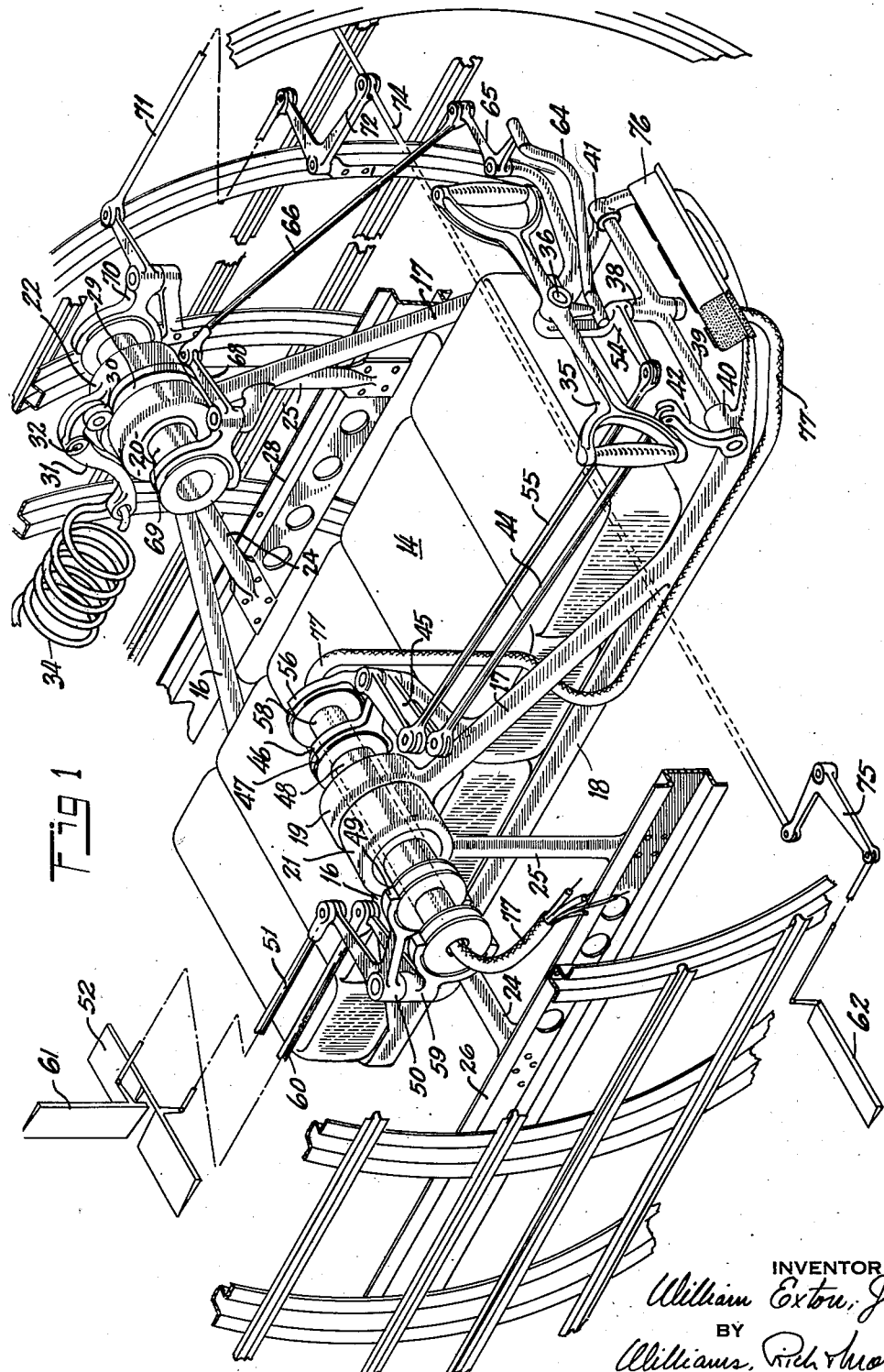

Referring to Fig. 3, which shows a form of the invention in which the structure for supporting the occupant is suspended pendulum fashion, the pilot 10 is normally supported in prone position, face down, within the cockpit 11 having windows 12, upon a pallet 14 which is suspended below the axis 15 by supporting framework 16, 17, 18. The center of gravity of the combined pallet structure and occupant is indicated by the spot marked CG, the structure being so designed as to place it, in a condition of rest, directly below and spaced a substantial distance from the axis 15.

The pallet 19 is shown as mounted in the nose of an airplane fuselage but it will be understood that it may be otherwise positioned or be incorporated in any other type of high speed conveyance where its use would be advantageous. It will further be understood that the entire pallet assembly, with or without a protective enclosing capsule, may be arranged for ejection and separation from the fuselage, as by an explosive charge in a manner already contemplated in the art, parachute means being provided for slowing the descent of the ejected accommodation affording the pilot an opportunity to extricate himself. Attachment of the parachute directly or indirectly to axis 15 will make possible utilization of the automatic attitude adjusting feature of the pallet in preserving the occupant against the inertia forces brought into play by violent ejection and sudden change in the rate of travel when separated from the propulsive power of the airplane.

Referring to Fig. 1, the details of construction of the pilot pallet generally described in conjunction with Fig. 3 are as follows:

The pallet 14 rests upon a supporting frame or cradle 18 which is suspended by the arms 16 and 17 from the hubs 19 and 20. These hubs serve as trunnions and are rotatably mounted on bearings 21 and 22 which are supported on uprights 24 and 25 secured to fixed members 26 and 28 of the airframe. Preferably the pallet is restrained against movement until the inertia force exceeds a predetermined amount by an appropriate form of detent. For example, there may be attached to hub 20 a cam 29 cooperating with a detent roller 30 attached to the end of a bell crank 31 pivoted at 32 and urged against a depression in cam 29 by a spring 34 which is attached to a fixed part of the airframe. Detent 30 holds the pallet 14 in a normally horizontal position until such time as the inertia forces attain magnitude sufficient to overcome the restraining effect of the detent; when the pallet is free to swing like a pendulum in a direction determined by the direction of the inertia force. Other detents such as shear pins may be used.

Associated with the pallet suspension there are shown the principal controls for directing the flight of the airplane, these controls operating in part through members concentric with the axis of the hubs 19 and 20, which axis is designated 15 in Fig. 3. The pilot's control lever or wheel is shown at 35 and it effects the usual controls by being rotated about its horizontal pivot 36 and its vertical pivot 38 and by being pushed forward and backward to rotate the elevator rock shaft 39 about its pivots 40 and 41. Attached to the end of rock shaft 39 is a crank 42 attached to a rod 44 which controls a bell crank 45 having a yoke 46 which is attached by a slip ring 47 to one of the flanged ends of an axially slidable shaft 48. This shaft passes through hub 19 and bearing 21 and connects at the other end in a similar manner with the yoke 49 on a crank 50 which operates rod 51 to control the elevator 52.

When the pilot's control 35 is rotated about its vertical pivot 38 it acts in a similar manner through lever 54, rod 55, yoke 56, sliding shaft 58, crank 59 and rod 60 to control the rudder 61.

Rotation of control 35 about its horizontal pivot 36 effects control of ailerons 62 through link 64, crank 65, rod 66, crank 68, sliding shaft 69, crank 70, rod 71, crank 72, rod 74, and crank 75.

It will thus be seen that the controls continue operative in all positions of the pallet 14. Associated with the pallet there may also be an instrument panel 76 having a control cable 77 which passes through the hollow sliding shaft 58, this panel carrying only those instruments which are essential to enable the pilot to guide the aircraft.

Referring to Fig. 2, in case of sudden and violent acceleration the inertia forces will cause the center of gravity of the combined mass of pilot 10 and pallet 14 and its associated supports to shift automatically into a position behind the axis 15, thus interposing the pallet between the pilot and the point to which the inertia forces tend to move him, that is toward the rear, supporting him against those forces and simultaneously placing him in such position that the force acts in a dorsal-ventral direction. In this position he is better able to withstand these forces physiologically and is protectd against possible loss of consciousness which would follow from application of the force in a direction from head to foot or vice versa.

Similarly, in case of violent deceleration, the center of gravity will be shifted automatically to a position forward of axis 15 with the result that the pilot is similarly supported and protected against the effects of such force, as shown in Fig. 4.

Referring now to Figs. 5 and 6, I have shown a modification of the support of the invention in the form of a seat 80 having a headrest 81 and a foot rest 82. This seat is rigidly attached to a supporting framework 84 which is pivotally supported at top and bottom from a davit 85 rotatably mounted to one side of the fuselage or body of the aircraft or other conveyance at 86 and 88. The seat is assumed to be normally facing in a forward direction. At its lower end the frame 84 is provided with a fixed pinion 89 which engages with rack portion 90 of a fixed shaft 91 which may be attached to the fuselage by a clevis 92. Surrounding the shaft 91 and pinion 89 is a housing 94 adapted to slide along shaft 91 and serving as a bearing to maintain the rack and pinion in engagement. At its forward end shaft 91 is provided with a buffer or shock absorber in the form of a spring 95 which bears against the fixed collar 96 and serves as a stop for housing 94, limiting the extent of movement of the seat.

Certain subject matter hereinabove described but not claimed herein is claimed in my copending application Ser. No. 272,023, filed February 18, 1952.

The structure just described is primarily intended to protect the occupant of seat 80 against the effects of sudden deceleration. The seat is normally held in its forwardly facing position by a detent 98 which is held in engagement with a lug 99 on a housing 94 by a spring 100, the tension of which may be adjusted so as to release the seat only when the inertia forces exceed a predetermined amount. Upon such release, housing 94 and frame 84 will move forward and travel of the pinion 89 along the rack 90 will cause the seat 80 to be rotated through 180° thus interposing the seat between the occupant and the point toward which the inertia forces are tending to move him. The seat assembly will be brought to a stop by engagement of housing 94 with the spring 95. It will be evident that the inertia forces will be acting upon the body of the occupant, at the time when its motion ceases, in a ventral-dorsal direction.

Referring to Figs. 7, 8 and 9 there is shown another form of seat, generally similar to that of Fig. 5 but actuated by crank mechanism instead of by a rack and pinion. The seat 101 is attached to a support 102 pivoted at top and bottom on a davit 104. Detent 105 engages a lug 106 attached to the davit and is held in engagement therewith by a spring 108. The davit is pivotally mounted at 109, 110. Frame 102 is provided at its lower end with a crank arm or lever 111 which is attached by the link 112 to a shock absorber 114 which is fixed to the airframe or vehicle body. Comparison of Figs. 8 and 9 shows that when inertia forces resulting from sudden deceleration are sufficient to overcome the restraining effect of detent 105, the ends of davit 104, together with the seat, will move forward and that link 112 acting through crank 111 will cause the seat to be rotated through 180°. At the end of this movement crank 111 and link 112 are in a straight line and are brought to a stop by the shock absorber 114.

While the structures of Figs. 5 and 7 are shown with seat-actuating mechanism only at the lower end, it is contemplated that such mechanism may be utilized at the upper end of the frames 84 or 102 or at both ends thereof, depending upon the magnitude of the forces which may be expected to operate upon the seats and their supports.

In conjunction with all embodiments of the invention shown and described it is also contemplated that the structures may be provided with manually operated controls by means of which the pallet or seat may be placed in any of the positions which they are capable of assuming under the influence of inertia forces in contemplation of the coming into effect of such forces. For example, a pilot contemplating a situation involving violent acceleration may place himself in the position shown in Fig. 2. Likewise occupants of the seats of Figs. 5 and 7 contemplating sudden deceleration as might exist in a forced landing or the cessation of propulsive power, may manually rotate the seats into reversed position in advance of such an event. Likewise a pilot occupying the pallet of Fig. 1 might manually place himself in the position shown in Fig. 4. Any such manual controls will of course be so arranged that they can be instantaneously released so that the accommodations will be restored to a condition of automatic operation.

While the invention has been described in conjunction with specific embodiments described in detail, it is to be understood that the invention is not limited thereto but is to be construed broadly within the purview of the claims.

What is claimed is:

1. A support for the pilot of aircraft comprising, a normally horizontal pallet adapted to support the pilot's body in prone position, means suspending said pallet from an axis fixed with relation to said aircraft, said axis being at right angles to the normal direction of flight and positioned above the combined center of gravity of said pallet and its occupant and its suspending structure, said pallet being rotatable about said axis in response to inertia force, and means for restraining movement of said pallet in response to inertia force below a predetermined amount.

2. A support for the pilot of aircraft comprising, a normally horizontal pallet adapted to support the pilot's body in prone position, means suspending said pallet from an axis fixed with relation to said aircraft, said pallet being rotatable about said axis in response to inertia force, and controls for said airplane movable with said pallet.

3. A support for the pilot of aircraft comprising, a normally horizontal pallet adapted to support the pilot's body in prone position, means suspending said pallet from an axis fixed with relation to said aircraft, said pallet being rotatable about said axis in response to inertia force, and controls for said airplane associated with said suspending structure and in part concentric with said axis so as to be unaffected by rotation of said pallet thereabout.

4. In an aircraft, supporting means movable in response to inertia forces comprising a pair of spaced-apart aligned bearing members, means attaching said bearing members to the frame of said aircraft with the axis of said members extending transversely of the aircraft in a normally horizontal direction, a cradle having a normally horizontal supporting surface and rigid upstanding arms on opposite sides of said surface, said arms having a pivotal connection with said bearings members whereby said cradle is rotatably suspended therefrom, said bearing members being positioned relative to the unobstructed space within said aircraft so as to permit rotation of said cradle through a full circle in a plane parallel to the normal direction of flight, the said axis of the bearing members being spaced from the combined center of gravity of said cradle and the mass supported thereby whereby said cradle moves solely in response to inertia forces into a position between said mass and the point toward which the inertia force is tending to move said mass.

WILLIAM EXTON, Jr.

REFERENCES CITED

The following references are of record in the file of this patent:

UNITED STATES PATENTS

| Number | Name | Date |
| --- | --- | --- |
| 249,247 | Laskey | Nov. 8, 1881 |
| 2,106,985 | Miller | Feb. 1, 1938 |
| 2,304,781 | Dillon | Dec. 15, 1942 |
| 2,401,748 | Dillon | June 11, 1946 |
| 2,433,950 | Henderson | Jan. 6, 1948 |